United States Patent
Serizawa et al.

(10) Patent No.: US 6,894,875 B2
(45) Date of Patent: May 17, 2005

(54) MAGNETIC HEAD SUSPENSION WITH BOTH PROTECTED WIRING AND UNPROTECTED WIRING, IN ADDITION TO TERMINALS

(75) Inventors: Tooru Serizawa, Shinjuku-ku (JP); Terutoshi Momose, Shinjuku-ku (JP); Nobuhiro Sakihama, Shinjuku-ku (JP); Youichi Nagai, Shinjuku-ku (JP); Tsuyoshi Yamazaki, Shinjuku-ku (JP); Michiaki Uchiyama, Shinjuku-ku (JP); Midori Chiba, Shinjuku-ku (JP)

(73) Assignee: Dai Nippon Printing Co., Ltd. (JP)

( * ) Notice: Subject to any disclaimer, the term of this patent is extended or adjusted under 35 U.S.C. 154(b) by 181 days.

(21) Appl. No.: 10/122,425

(22) Filed: Apr. 16, 2002

(65) Prior Publication Data

US 2002/0181157 A1 Dec. 5, 2002

(30) Foreign Application Priority Data

Apr. 18, 2001 (JP) .................................... 2001-119324

(51) Int. Cl.$^7$ ............................................. G11B 5/55
(52) U.S. Cl. ................................. 360/264.2; 360/245.9
(58) Field of Search .................... 360/264.2, 245.8–246

(56) References Cited

U.S. PATENT DOCUMENTS 5,809,634 A * 9/1998 Inaba ...................... 29/603.04
5,986,853 A * 11/1999 Simmons et al. ........ 360/245.9

* cited by examiner

Primary Examiner—A. J. Heinz
(74) Attorney, Agent, or Firm—Parkhurst & Wendel, L.L.P.

(57) ABSTRACT

A magnetic head suspension includes an insulating base (12), wiring parts (13) formed on one surface of the insulating base (12) including a conductive metal layer, an elastic metal plate (14) provided on the other surface of the insulating base (12), and a wiring protecting layer (19) covering the wiring parts (13). The wiring protecting layer (19) is formed by subjecting a dry film containing an epoxy resin, an acrylic resin and a polymer containing aromatic rings to exposure and developing processes.

8 Claims, 4 Drawing Sheets

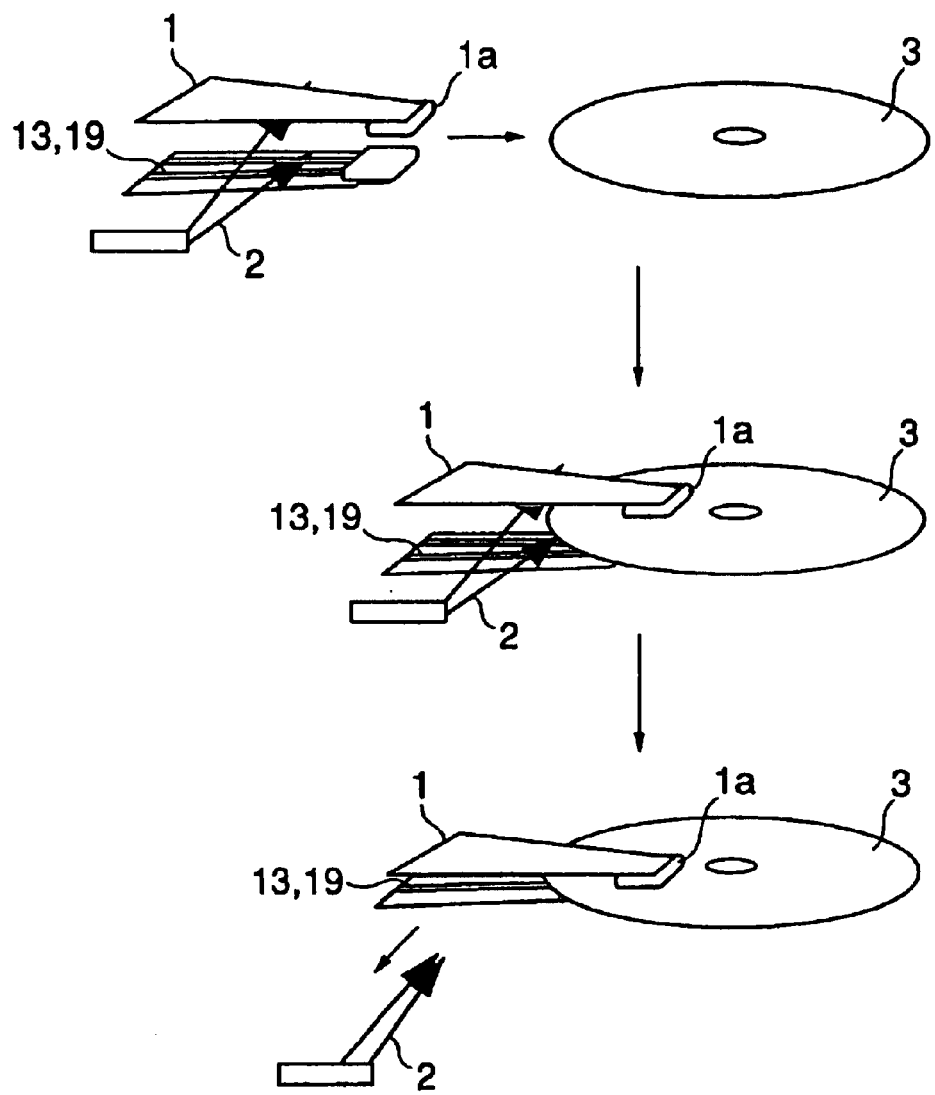
F I G. 1
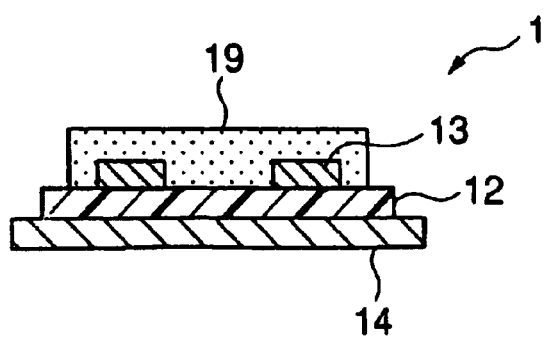
F I G. 2

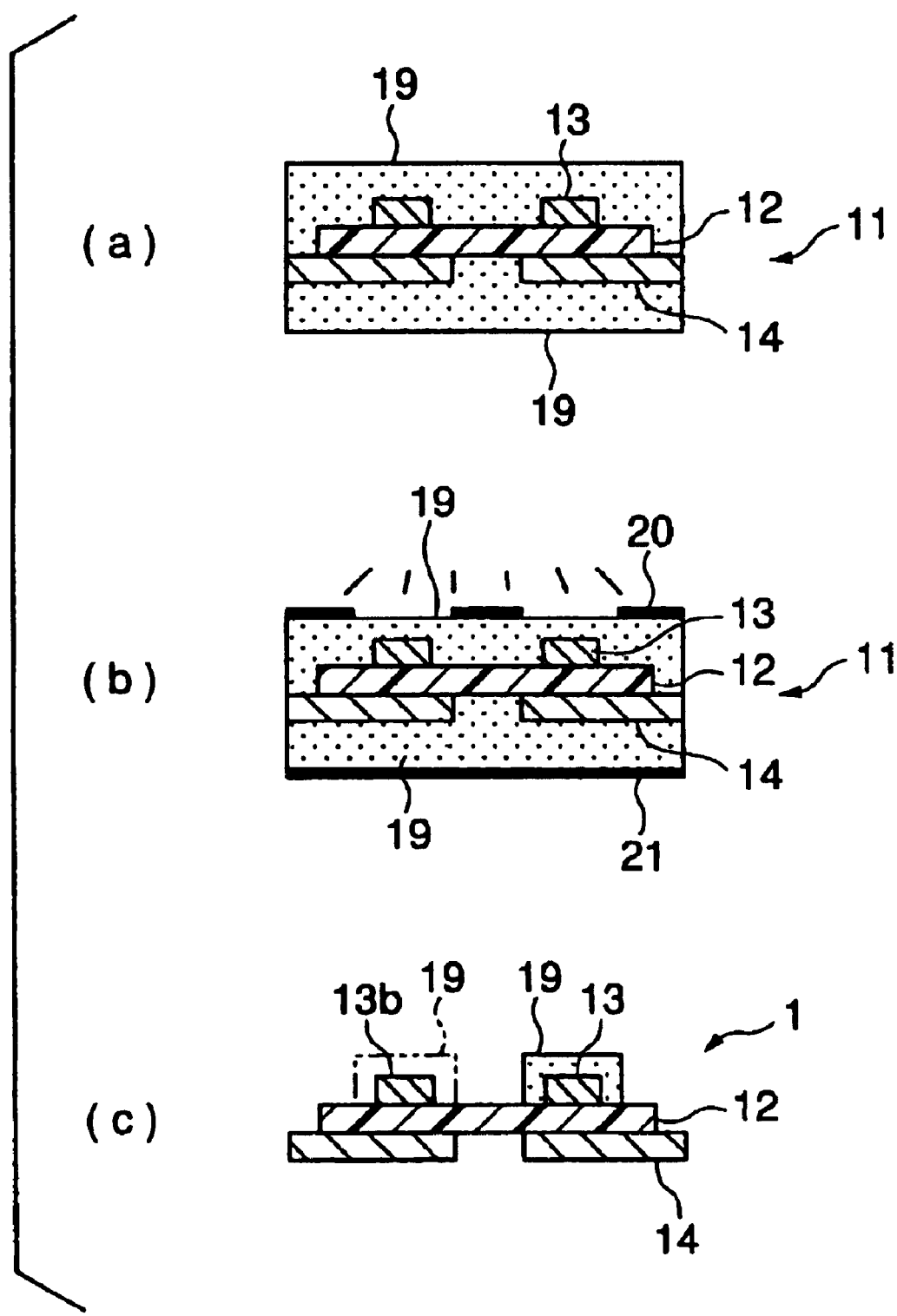
F I G. 4

MAGNETIC HEAD SUSPENSION WITH BOTH PROTECTED WIRING AND UNPROTECTED WIRING, IN ADDITION TO TERMINALS

BACKGROUND OF THE INVENTION

1. Field of the Invention

The present invention relates to a magnetic head suspension to be employed for a magnetic disk, i.e., a data storage device, and a method of fabricating such a magnetic head suspension.

2. Description of the Related Art

A magnetic head suspension included in a magnetic disk drive operates for reading information from and writing information to a magnetic disk. Magnetic head suspensions with wiring are used prevalently in recent years. Each magnetic head suspension holds a slider at its extremity. When two such magnetic head suspensions are used in combination, the magnetic head suspensions are spaced apart from each other by a suspension opening device, such as an opening tool or a robot arm, the magnetic head suspensions thus spaced apart are advanced toward a magnetic disk, and then the opening tool is removed from the magnetic head suspensions to let the sliders come into contact with the magnetic disk.

When the suspension opening device, such as an opening tool, is thus inserted in the space between the magnetic head suspensions to set the magnetic head suspensions on the magnetic disk, it is possible that the suspension opening device damages gold-plated wiring parts formed on the inner surfaces of the magnetic head suspensions. Therefore the gold-plated wiring parts are covered with a wiring protecting layer to protect the same from the possible damaging action of the suspension opening device.

The wiring protecting layer of the magnetic head suspension is formed, in most cases, of a liquid photosensitive resin, such as a photosensitive polyimide resin or a photosensitive epoxy resin. The wiring protecting layer is formed by applying a liquid photosensitive resin by a screen printing or a roll coating process to form photosensitive resin film on a workpiece. The workpiece is subjected to a drying process to remove the solvent from the photosensitive resin film, the resin film is exposed to light through a mask and the exposed resin film is developed to form a resin pattern, and, when necessary, the resin pattern is subjected to a hardening process.

When the wiring protecting layer of the magnetic head suspension is formed by processing the liquid photosensitive resin, it is difficult to apply the liquid photosensitive resin to a shaped workpiece having the shape of the suspension arm and provided with the wiring parts, and the drying process for removing the solvent needs additional time.

Some wiring protecting layers are formed from a photosensitive resin dry film containing a polyimide resin or a polyether-urethane resin. However, such a photosensitive resin dry film containing urethane bonds is not resistant to some chemicals, such as a flux cleaning agent, and is unsatisfactory in heat resistance.

SUMMARY OF THE INVENTION

The present invention has been made in view of the foregoing problem and it is therefore an object of the present invention to provide a magnetic head suspension provided with a wiring protecting layer excellent in chemical resistance, satisfactory in heat resistance and capable of being formed at a low cost, and to provide a method of fabricating such a magnetic head suspension.

A magnetic head suspension in one aspect of the present invention includes: an insulating base; a wiring part provided on one surface of the insulating base, including a conductive metal layer; an elastic metal plate provided on the other surface of the insulating base; and a wiring protecting layer covering the wiring parts; wherein the wiring protecting layer is formed by subjecting a photosensitive resin film to exposure and developing processes.

In the magnetic head suspension according to the present invention, the photosensitive resin film may be a dry film containing an epoxy resin, an acrylic resin and a polymer containing aromatic rings.

In the magnetic head suspension according to the present invention, the wring protecting layer may protect the wiring with a part of the wiring parts being exposed outside.

In the magnetic head suspension according to the present invention, the exposed part of the wiring parts is cleaned by plasma cleaning.

A magnetic head suspension fabricating method in another aspect of the present invention includes the steps of: preparing an insulating base; forming wiring parts including a conductive metal layer on one surface of the insulating base; providing an elastic metal plate to the other surface of the insulating base; and forming a wiring protecting layer over the wiring parts so that a part of the wiring is exposed.

In the magnetic head suspension fabricating method according to the present invention, the wiring protecting layer may be formed by forming a film of a photosensitive resin containing an epoxy resin, an acrylic resin and a polymer containing aromatic rings, and subjecting the film of the photosensitive resin to exposing and developing processes.

The magnetic head suspension fabricating method according to the present invention may further include the step of processing the exposed part of the wiring by a plasma cleaning process.

In the magnetic head suspension fabricating method according to the present invention, the time of the plasma cleaning process may be in the range of 0.1 s to 30 min.

In the magnetic head suspension fabricating method according to the present invention, the plasma cleaning process may be performed under a negative pressure.

In the magnetic head suspension fabricating method according to the present invention, the plasma cleaning process may be performed under a normal pressure.

In the magnetic head suspension fabricating method according to the present invention, the plasma cleaning process may use one of or a mixture of some of a perfluorocarbon gas, an inorganic halogen gas, a rare gas, a hydrocarbon gas and oxygen gas.

In the magnetic head suspension fabricating method according to the present invention, the plasma cleaning process may be performed with component members of the magnetic head suspension excluding the exposed part of the wiring being covered.

BRIEF DESCRIPTION OF THE DRAWINGS

FIG. 1 is a schematic perspective view of a magnetic head suspension in a first embodiment according to the present invention;

FIG. 2 is a typical sectional view of the magnetic head suspension shown in FIG. 1;

FIG. 4 is a typical sectional view of assistance in explaining the method of fabricating the magnetic head suspension shown in FIG. 1.

DESCRIPTION OF THE PREFERRED EMBODIMENTS

First Embodiment

Figure 3:
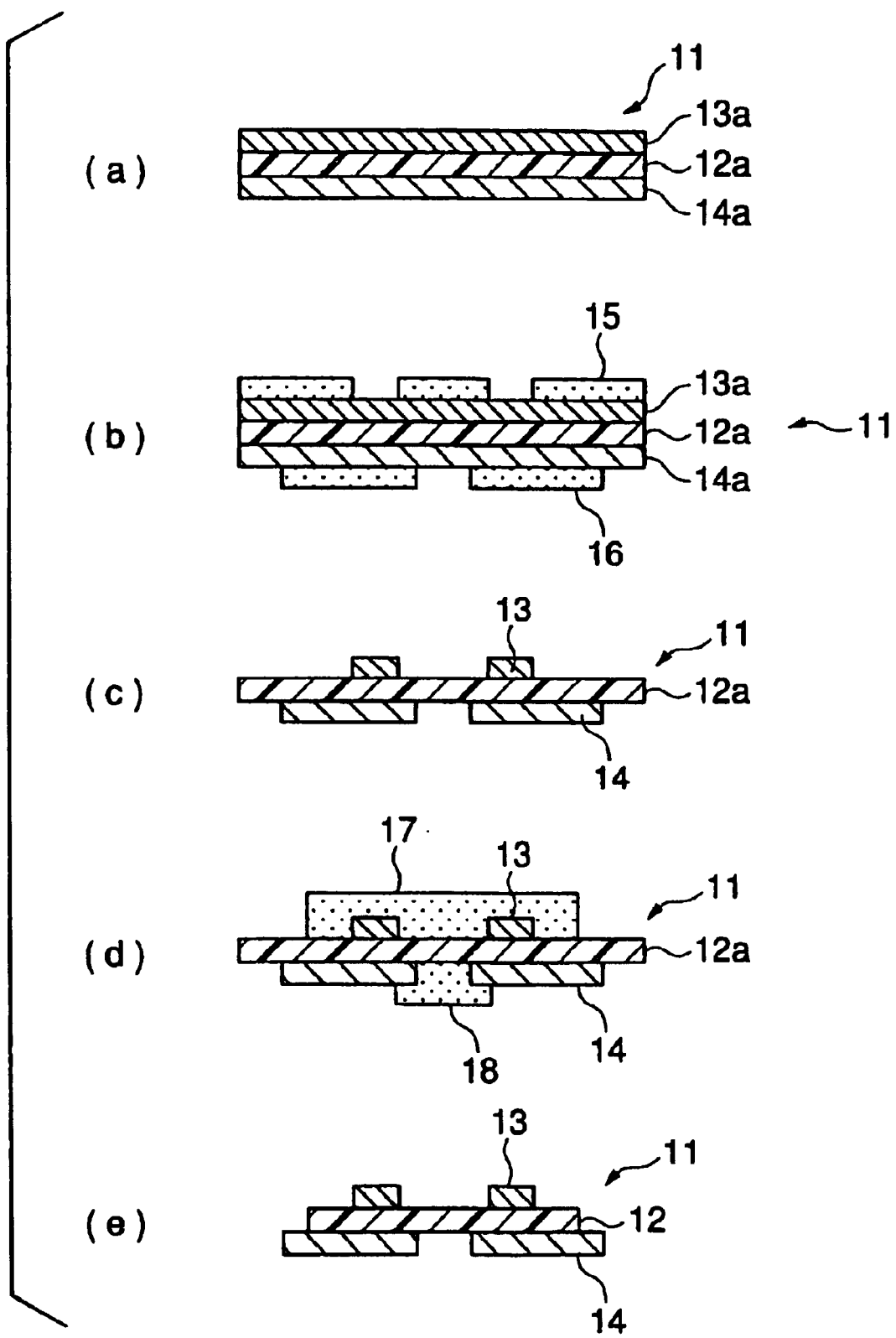
FIG. 3 is a typical sectional view of assistance in explaining a method of fabricating the magnetic head suspension shown in FIG. 1.

Preferred embodiments of the present invention will be described with reference to the accompanying drawings. Referring to FIG. 1 showing a magnetic head suspension 1 in a first embodiment according to the present invention, the magnetic head suspension 1 is provided with a slider 1a including a magnetic head on its extremity. When the two magnetic head suspensions 1 are used in combination, the magnetic head suspensions 1 are spaced apart from each other by an opening tool 2. The magnetic head suspensions 1 thus spaced apart are advanced toward a magnetic disk 3, and then the opening tool 2 is removed from the magnetic head suspensions 1 to let the sliders 1a come into contact with the magnetic disk 3.

The magnetic head suspension 1 is provided on its inner surface with a wiring (wiring parts) 13, and the wiring (wiring parts) 13 is covered for protection with a wiring protecting layer 19.

Referring to FIG. 2 showing the magnetic head suspension 1 in a cross-sectional view, the magnetic head suspension 1 includes an insulating base 12, the wiring parts 13 formed by processing a conductive metal layer on one surface of the insulating base 12, and an elastic metal plate 14 provided on the other surface of the insulating base 12.

The elastic metal plate 14 is formed in a desired shape. The wiring (wiring parts 13) excluding a wiring part 13b are covered with the wiring protecting layer 19. The wiring part 13b is not covered with the wiring protecting layer 19 and is exposed as shown in FIG. 4(c).

The wiring protecting layer 19 is formed by processing a photosensitive resin film to exposure and developing processes. The photosensitive resin film is a dry film containing an epoxy resin, an acrylic resin and a polymer containing aromatic rings.

Preferably, the insulating base 12 is formed of a polyimide resin film, the wiring parts 13 are formed of a copper film as a conductive metal layer, and the elastic metal plate 14 is formed of a stainless steel.

Although not shown in the drawings, predetermined parts of the wiring parts 13 are gold-plated for electrical connection, and the magnetic head suspension 1 is provided with solder bumps for use in connecting the magnetic head suspension 1 to external devices.

The steps of fabricating the magnetic head suspension 1 will be described with reference to FIGS. 3 and 4. Sections of the magnetic head suspension 1 shown in FIGS. 3 and 4 are different from that shown in FIG. 2.

FIG. 3(a) shows a laminated blank 11 as a blank for fabricating the magnetic head suspension 1. The laminated blank 11 has an insulating base material 12a of a polyimide resin film, a conductive layer 13a of copper laminated to one surface of the insulating base 12a, and an elastic metal plate 14a of a stainless steel laminated to the other surface of the insulating base material 12a.

As shown in FIG. 3(b), patterned resist films 15 and 16 are formed on both the surfaces of the laminated blank 11 by a photofabrication method. The patterned resist film 15 for forming wiring parts is formed on the surface of the conductive metal layer 13a, and the patterned resist film 16 for shaping is formed on the surface of the elastic metal plate 14a. Preferably, the patterned resist films 15 and 16 are formed by patterning dry film resists. The patterned dry film resists 15 and 16 may be formed by patterning films of a liquid resist, such as casein.

Parts of the conductive metal layer 13a and the elastic metal plate 14a are etched through the patterned resist films 15 and 16, with an etchant, such as a ferric chloride solution, and then the patterned resist films 15 and 16 are removed by using an alkaline stripping solution. Thus, the wiring parts 13 of the conductive metal layer 13a are formed and the elastic metal plate 14a is shaped to form the elastic metal plate 14 as shown in FIG. 3(c).

Then, as shown in FIG. 3(d), patterned resist films 17 and 18 of predetermined patterns are formed by a photofabrication method on the exposed surfaces of the insulting base material 12a. The patterned resist films 17 and 18 for use in processing the insulating base material 12a may be selectively determined taking into consideration conditions for an etching process for etching the insulating base material 12a, and may be a dry film resist or a liquid resist suitable for forming a thick resist layer.

Then, parts of the surfaces of the insulating base material 12a are etched through the patterned resist films 17 and 18 to shape the insulating base material 12a in a predetermined shape, and then the patterned resist films 17 and 18 are removed to form the insulating base 12 as shown in FIG. 3(e).

Photosensitive resin dry films 19 are laminated to the laminated blank 11 which has been thus processed and provided with openings as shown in FIG. 4(a). The photosensitive resin dry films 19 may be dry films, commercially known as solder resist, containing an epoxy resin, an acrylic resin and a polymer containing aromatic rings, such as a polystyrene resin. For example, "Confor MASK" commercially available from Nichigo-Morton Co., Ltd. may be used for the photosensitive resin films 19. The photosensitive resin films 19 may be laminated to the laminated blank 11 by a vacuum laminator or a roll laminator, preferably, at a temperature in the range of 40 to 80° C.

Then, as shown in FIG. 4(b), the photosensitive resin films 19 are exposed to light through masks 20 and 21, preferably, at an exposure in the range of 40 to 1000 mJ/cm$^2$. The exposed photosensitive resin films 19 are developed by a developing process using an alkaline solution of a concentration in the range of about 0.75 to about 1.5%, such as a sodium carbonate solution or a potassium carbonate solution to pattern the photosensitive resin films 19 as shown in FIG. 4(c). Remaining parts of the photosensitive films 19 serve as the wiring protecting layer 19 for protecting the wiring parts 13. The wiring part 13b among the wiring parts 13 is not covered with the wiring protecting layer 19 and is exposed.

The parts of the wiring protecting layer 19 of the photosensitive resin remaining after development are subjected to a thermal hardening process to provide the remaining parts of the wiring protecting layer 19 with predetermined coating characteristics. In the thermal hardening process, the wiring protecting layer 19 is heated at a temperature in the range of about 150 to about 200° C. for about 1 to 2 hr. The exposed wiring part 13b is gold-plated for electrical connection after the thermal hardening process. The gold-plating process for the exposed wiring part 13b may be performed immediately before the formation of the wiring protecting layers 19.

Thus, a semifinished magnetic head suspension is obtained. Solder bumps, not shown, are formed on the semifinished magnetic head suspension, the semifinished magnetic head suspension is subjected to machining and assembling to complete the magnetic head suspension 1 with wiring.

Although the magnetic head suspension in the first embodiment and the method of fabricating the same have been described, the present invention is not limited in its practical application to the foregoing embodiment and various changes may be made therein without departing from the scope of the present invention.

The magnetic head suspension includes the insulating base, the wiring parts formed on one surface of the insulating base by processing a conductive metal layer, the shaped, elastic metal plate joined to the other surface of the insulating base, and the wiring protecting layer protecting the wiring parts. The wiring protecting layer formed of the photosensitive resin containing an epoxy resin, an acrylic resin and a polymer containing aromatic rings. As compared with a conventional wiring protecting layer of a resin containing urethane bonds, the wiring protecting layer of the present invention the wiring protecting layer of the present invention is excellent in chemical resistance against a flux cleaning agent which is used when forming solder bumps for connecting the wiring parts to external circuits, is satisfactory in heat resistance, and is inexpensive.

In the magnetic head suspension fabricating method according to the present invention, the wiring parts are formed by processing a conductive metal layer on one surface of the insulating base, the elastic metal plate is provided to the other surface of the insulating base, and the wiring parts are covered with the wiring protecting layer for protection. The wiring protecting layer is formed by exposing and developing the photosensitive resin dry film containing an epoxy resin, an acrylic resin and a polymer containing aromatic rings. Thus, the wiring protecting layer can be formed without any difficult processes, such as applying a liquid resist to a base material and drying the film of the liquid resist. The costs of the material of the wiring protecting layer and the process of forming the wiring protecting layer can be reduced.

Second Embodiment

Figure 5:
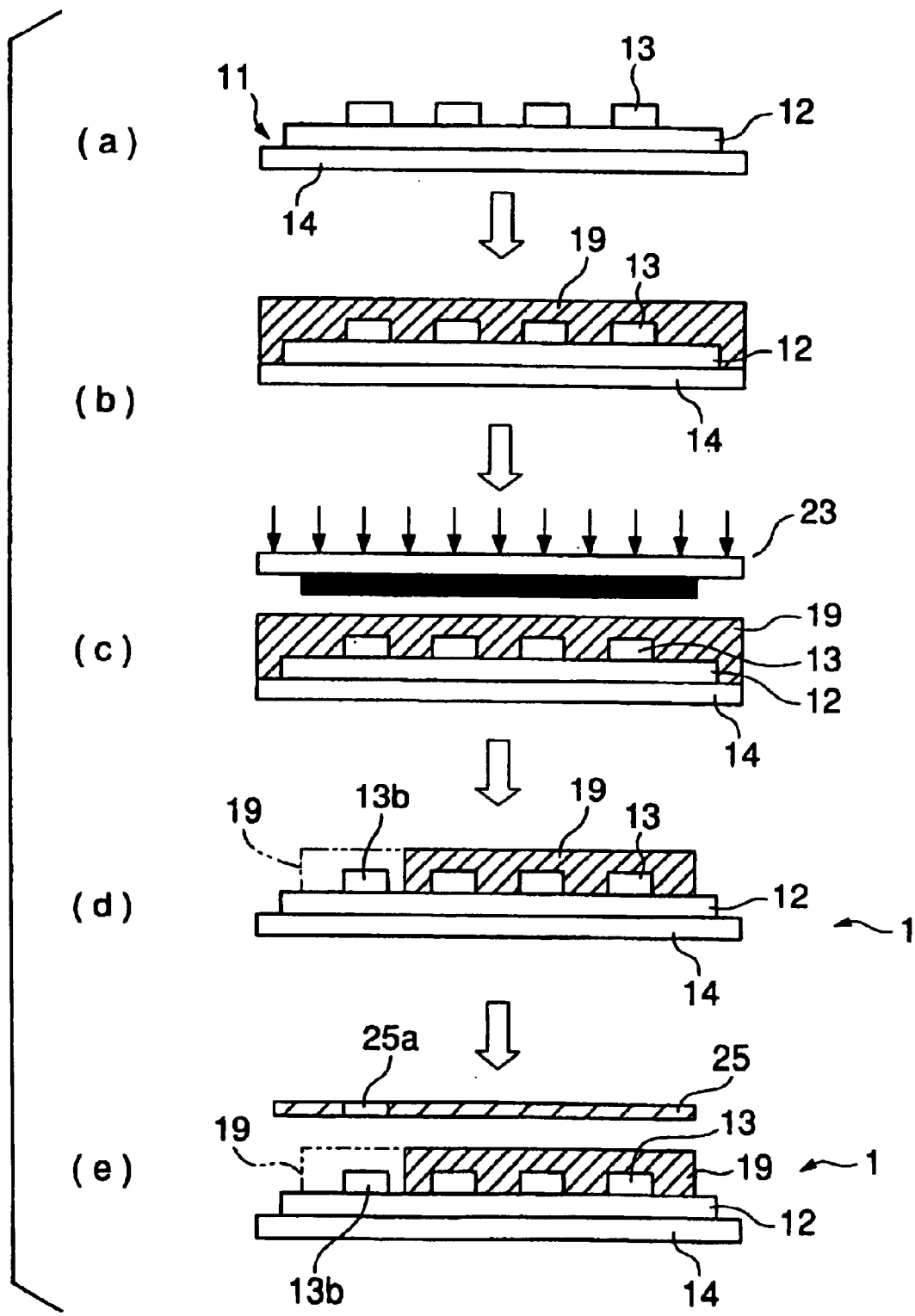
FIG. 5 is a typical sectional view of assistance in explaining a magnetic head suspension fabricating method in a second embodiment according to the present invention.

Referring to FIG. 5, a magnetic head suspension 1 in a second embodiment according to the present invention includes an insulating base 12, a wiring (wiring parts 13) formed by processing conductive metal layer formed on one surface of the insulating base 12, and an elastic metal plate 14 provided on the other surface of the insulating base 12. The wiring parts 13 excluding a wiring part 13b are covered with a wiring protecting layer 19. The wiring part 13b is exposed outside.

The magnetic head suspension 1 is fabricated by processing a three-layer laminated blank 11 consisting of a first metal layer, an insulating layer and a second metal layer.

The first metal layer of the laminated blank 11 is formed of a metal having a high electrical conductivity, such as a cupreous metal or a copper alloy. The wiring parts 13 are formed by forming a photoresist film over the first metal layer, exposing and developing the photoresist film to form a photoresist mask, and etching the first metal layer through the photoresist mask.

The insulating layer of the laminated blank 11 is formed of a polyimide resin. The insulating layer of the polyimide resin is processed by a plasma etching process, i.e., a dry etching process, or a wet etching process. The insulating base 12 is formed by processing the insulating layer of the polyimide resin by an etching process selectively using a photosensitive dry film resist or a liquid resist capable of forming a thick resist film according to etching means.

The second metal layer of the laminated blank 11 is a thin sheet of a stainless steel. The second metal layer is processed, similarly to the first metal layer, for shaping by forming a photoresist film over the second metal layer, exposing and developing the photoresist film to form a photoresist mask, and etching the second metal layer through the photoresist mask to form the elastic metal plate 14. A wiring protecting layer 19 on the thus processed laminated blank 11 by a process including steps shown in FIGS. 5(a) to 5(d).

A photosensitive resin for forming the wiring protective layer 19 is an epoxy resin, an acrylic resin, a polyimide resin, a polymer containing aromatic rings or a mixture of some of those resins and polymer.

When forming the wiring protecting layer 19 of a liquid photoresist, a liquid photoresist film is formed by printing over the wiring parts 13 formed on the insulating base 12 shown in FIG. 5(a), the liquid photoresist film is dried to form a photoresist film for the wiring protecting layer 19 as shown in FIG. 5(b). The photoresist film is exposed to light through a mask 23 of a predetermined pattern as shown in FIG. 5(c). Then, the exposed photoresist film is developed to remove unnecessary parts thereof corresponding to parts of the wiring parts 13 to be exposed for connection to a magnetic head held on a slider 1a and an amplifier through by ultrasonic bonding or soldering. Then, the developed photoresist film is subjected to a hardening process using heat, ultraviolet rays or the like to complete the wiring protecting layer 19. The wiring part 13b among the wiring parts 13 is not covered with the wiring protecting layer 19 and is exposed outside. Thus, the magnetic head suspension 1 with wiring as shown in FIG. 5(d) is completed.

When a dry film resist is used for forming the wiring protecting layer 19, the dry film resist is laminated to the insulating base 12 so as to cover the wiring parts 13. Then, the dry film resist is exposed to light through a mask 23 of a predetermined pattern. The exposed dry film resist is developed to remove unnecessary parts thereof corresponding to parts of the wiring parts 13 to be exposed for connection to the magnetic head held on the slider 1a and the amplifier through ultrasonic bonding or soldering. Then, the developed dry film resist is subjected to a hardening process using heat, ultraviolet rays or the like to complete the wiring protecting layer 19 (FIGS. 5(a) to 5(d)).

Then, as shown in FIG. 5(e), the exposed wiring part 13b is subjected to a plasma cleaning process to clean the surface of the exposed wiring part 13b. The surface of the exposed wiring part 13b is treated by the plasma cleaning process for a time in the range of 0.1 s to 30 min for decontamination. The time (duration) of the plasma cleaning process is adjusted properly taking into consideration the degree of contamination of the surface of the exposed wiring part 13b and process conditions.

The plasma cleaning process uses a low-temperature plasma. The plasma cleaning process utilizes the chemical reaction of active radicals contained in a plasma, the energy of positive ions accelerated by an electric field, and heat. A plasma cleaning system employed in the present invention is a diode parallel-plate plasma-enhanced RIE system.

A process pressure used by the plasma cleaning system may be a negative pressure or a normal pressure, preferably, in the range of 0.1 to 100 Pa. The plasma cleaning system is provided with a radio-frequency power source capable of supplying power of a frequency in the range of 40 kHz to 13.56 MHz. The plasma cleaning system uses polyfluorocarbon gas, inorganic halogen gas, a rare gas, $NF_3$ gas, $CF_4$ gas, $O_2$ gas or a mixture of some of those gases as a process gas. The process gas or the mixed gas, and gas mixing ratio are selectively determined taking into consideration a processing method and the level of contamination. If the exposed wiring part 13b is heavily contaminated, the duration of the plasma cleaning process must be long or the intensity of the cleaning action of the plasma cleaning process must be high. Preferably, the duration of the plasma cleaning process is in the range of 0.1 s to 30 min.

It is possible that the plasma cleaning process damages the wiring protecting layer 19 covering the wiring parts 13 excluding the exposed wiring part 13b, the insulating base 12 or the elastic metal plate 14. To avoid damaging those parts by the plasma cleaning process, it is effective to cover those parts physically with a screening sheet 25 of a plastic material provided with an aperture 25a. The screening plastic sheet 25 may be any suitable, comparatively plasma-resistant sheet, such as a PET film.

The screening sheet 25 can protect the component parts of the magnetic head suspension 1 excluding the exposed wiring part 13b.

EXAMPLES

Example 1

Magnetic head suspensions in Examples 1 and 2 of the magnetic head suspension 1 shown in FIG. 5 will be described.

Photosensitive resin layers of a ultraviolet-curable resin were formed on the opposite surfaces of a three-layer laminated blank 11 consisting of a first metal layer, an insulating layer and a second metal layer, i.e., the surfaces of the first metal layer and the second metal layer. Masks of desired patterns were placed in close contact with the photosensitive resin layers, respectively, and then the photosensitive resin layers were exposed to ultraviolet rays of a wavelength to which the ultraviolet-curable resin was sensitive. The ultraviolet-curable resin was a negative photosensitive resin. Then, unexposed parts of the photosensitive resin layers were dissolved to form etching masks of patterns corresponding to desired shapes on the first and the second metal layer, respectively. Then, the first and the second metal layers were sprayed through the etching masks with a ferric chloride solution for etching, and the photosensitive resin layers were removed by a predetermined removing solution to form wiring parts 13 and an elastic metal plate 14 on the opposite surfaces of the insulating layer 12.

Subsequently, a photosensitive resin layer of an ultraviolet-curable resin was formed on the laminated blank 11 by vacuum lamination. A mask of a desired pattern was placed in close contact with the photosensitive resin layer, and the photosensitive resin layer was exposed to ultraviolet rays of a wavelength to which the ultraviolet-curable resin was sensitive. The ultraviolet-curable resin was a negative photosensitive resin. Then, unexposed parts of the photosensitive resin layer were dissolved to form an etching mask of a desired pattern. Then, the insulating layer was etched by a plasma etching process through the etching mask, and then the etching mask was removed by a predetermined removing solution to obtain an insulating base 12.

Subsequently, the laminated blank 11 provided with the wiring parts 13 and the elastic metal plate 14 was pretreated for degreasing, pickling and replacement prevention, and the wiring parts 13 were gold-plated to facilitate soldering.

Then, a photosensitive resin layer 19 of a negative, alkali-developable solder dry film resist was formed on the laminated blank 11 by vacuum lamination (FIGS. 5(a) and 5(b)). The solder dry film resist contained an epoxy resin, an acrylic resin and a polymer containing aromatic rings.

Then, the photosensitive resin layer 19 was exposed to light through a mask 23 of a predetermined pattern (FIG. 5(c)), the exposed photosensitive resin layer 19 was developed and dried (FIG. 5(d)), and the dried photosensitive resin layer 19 was cured in an oven for hardening to complete a wiring protecting layer 19 covering the wiring parts 13 excluding a wiring part 13b.

The wiring part 13b of the magnetic head suspension with wiring thus fabricated was subjected to a plasma cleaning process using a process pressure in the range of 25 to 30 Pa, an Ar—$O_2$ mixed gas as a process gas and 40 kHz power (FIG. 5(e)).

Example 2

Photosensitive resin layers of a photosensitive dry film resist were laminated to the opposite surfaces of a three-layer laminated blank 11 consisting of a first metal layer, an insulating layer 12 and a second metal layer, i.e., the surfaces of the first metal layer and the second metal layer. Masks of desired patterns were placed in close contact with the photosensitive resin layers, respectively, and then the photosensitive resin layers were exposed to ultraviolet rays of a wavelength to which the photosensitive dry film resist was sensitive. The photosensitive dry film resist was a negative photosensitive resin. Then, unexposed parts of the photosensitive resin layers were dissolved to form etching masks of patterns corresponding to desired shapes on the first and the second metal layer, respectively. Then, the first and the second metal layers of the laminated blank 11 were sprayed through the etching masks with a ferric chloride solution for etching, and the photosensitive resin layers were removed by a predetermined removing solution to form wiring parts 13 and an elastic metal plate 14 on the opposite surfaces of the insulating layer 12.

Subsequently, a photosensitive resin layer of a photosensitive dry film resist was formed on the laminated blank 11 by vacuum lamination. A mask of a desired pattern was placed in close contact with the photosensitive resin layer, and the photosensitive resin layer was exposed to ultraviolet rays of a wavelength to which the photosensitive dry film resist was sensitive. The photosensitive dry film resist was a negative photosensitive resin. Then, unexposed parts of the photosensitive resin layer were dissolved to form an etching mask of a desired pattern. Then, the insulating layer was etched by a wet etching process through the etching mask, and then the etching mask was removed by a predetermined removing solution to obtain an insulating base 12.

Subsequently, the laminated blank 11 provided with the wiring parts 13 and the elastic metal plate 14 was pretreated for degreasing and pickling, and the wiring parts 13 were nickel- and gold-plated to facilitate ultrasonic bonding.

Then, a photosensitive resin layer 19 of a liquid alkali-developable resin was formed on the laminated blank 11 by a printing process (FIGS. 5(a) and 5(b)). The liquid alkali-developable resin was a mixture of an epoxy resin and an acrylic resin.

Then, the photosensitive resin layer 19 is exposed to light through a mask 23 of a predetermined pattern (FIG. 5(c)), the exposed photosensitive resin layer 19 was developed by a sodium carbonate solution, and dried (FIG. 5(d)), and the dried photosensitive resin layer 19 was cured in an oven for hardening to complete a wiring protecting layer 19 covering the wiring parts 13 excluding a wiring part 13b.

The wiring part 13b of the magnetic head suspension with wiring thus fabricated was subjected to a plasma cleaning process using a process pressure in the range of 25 to 30 Pa, an Ar—$O_2$ mixed gas as a process gas and 40 kHz power (FIG. 5(e)).

The cleanliness of the surfaces of the wiring parts 13b of the magnetic head suspensions with wiring in Examples 1 and 2 was measured by auger electron spectroscopy (AES). Test samples were prepared by gold-plating copper wiring lines, and cleaning parts of the copper wiring lines exposed because parts of the gold films covering the copper wiring lines are excessively thin by a plasma cleaning process. Data on comparative examples was obtained by measuring the cleanliness of the gold-plated surfaces before the plasma cleaning process.

TABLE 1

|  | Au | C | Cu |
| --- | --- | --- | --- |
| Ex. 1 (Before cleaning) | 100 | 170 | 6 |
| Ex. 2 (Before cleaning) | 100 | 210 | 7 |
| Ex. 1 (After cleaning) | 100 | 33 | Undetectable |
| Ex. 2 (After cleaning) | 100 | 51 | Undetectable |

Two test samples of each of Examples 1 and 2 were tested. Cleanliness is indicated by normalized values determined by normalizing the values of carbon (C) and copper (Cu) by that of gold (Au) represented by 100. It is known from Table 1 that copper contaminants produced by the diffusion of copper over the surface of the gold film could be removed by the plasma cleaning process and the surfaces of the gold films were cleaned satisfactorily.

According to the present invention, the exposed wiring part 13b can be cleaned by the plasma cleaning process after the formation of the wiring protecting layer 19. The plasma cleaning process is particularly effective when the plating process for plating the wiring parts 13 to facilitate ultrasonic bonding or soldering is performed before the formation of the wiring protective layer 19. The surfaces of the wiring parts 13 can be cleaned by the plasma cleaning process and thereby the electrical connection of the magnetic head and the amplifier by ultrasonic bonding or soldering can be satisfactorily achieved. As a result, the reliability of a product provided with the magnetic head suspension of the present invention can be improved.

When the insulating base 12 between the elastic metal plate 14 and the wiring parts 13 of the laminated blank 11 for forming the magnetic head suspension with wiring is shaped by a plasma etching process, the plasma cleaning system can be used not only for the plasma etching of the insulating base 12 but also for the plasma cleaning of the wiring part 13b.

As apparent from the foregoing description, according to the present invention, a wiring protecting layer excellent in chemical resistance and satisfactory in heat resistance can be obtained. The exposed wiring part not covered with the wiring protecting layer can be effectively cleaned by the plasma cleaning process.

What is claimed is:

1. A magnetic head suspension comprising:
   an insulating base;
   a wiring provided on one surface of the insulating base, including a conductive metal layer;
   an elastic metal plate provided on the other surface of the insulating base; and
   a wiring protecting layer covering the wiring;
   wherein (1) the wiring protecting layer is formed by subjecting a photosensitive resin film to exposure and developing processes so that a part of the photosensitive resin film is retained as the wiring protecting layer, (2) the wiring protecting layer protects the wiring with a part of the wiring other than terminals being exposed outside the wiring protecting layer, and (3) the photosensitive resin film is a dry film containing an epoxy resin, an acrylic resin and a polymer containing aromatic rings.

2. The magnetic head suspension according to claim 1, wherein
   the exposed part of the wiring is cleaned by plasma cleaning.

3. A magnetic head suspension fabricating method comprising the steps of:
   preparing an insulating base;
   forming wiring including a conductive metal layer on one surface of the insulating base;
   providing an elastic metal plate to the other surface of the insulating base; and
   shaping the insulating base in a predetermined shape by etching the insulating base through patterned resist films on the insulating base; and
   forming a wiring protecting layer over the wiring so that a part of the wiring is exposed outside the wire protecting layer, the wiring protecting layer is formed by forming a film of a photosensitive resin containing an epoxy resin, an acrylic resin and a polymer containing aromatic rings, and subjecting the film of the photosensitive resin to exposing and developing processes so that a part of the photosensitive resin film is retained as the wiring protecting layer, and the exposed part of the wiring is cleaned by a plasma cleaning process.

4. The magnetic head suspension fabricating method according to claim 3, wherein
   time of the plasma cleaning process is in the range of 0.1 s to 30 min.

5. The magnetic head suspension fabricating method according to claim 3, wherein
   the plasma cleaning process is performed under a negative pressure.

6. The magnetic head suspension fabricating method according to claim 3, wherein
   the plasma cleaning process is performed under a normal pressure.

7. The magnetic head suspension fabricating method according to claim 3, wherein
   the plasma cleaning process uses one of or a mixture of some of perfluorocarbon gas, an inorganic halogen gas, a rare gas, a hydrocarbon gas and oxygen gas.

8. The magnetic head suspension fabricating method according to claim 3, wherein
   the plasma cleaning process is performed with component members of the magnetic head suspension excluding the exposed part of the wiring being covered.

* * * * *